United States Patent
Ayvaci et al.

(10) Patent No.: US 9,971,934 B2
(45) Date of Patent: *May 15, 2018

(54) SYSTEM AND METHOD FOR PARTIALLY OCCLUDED OBJECT DETECTION

(71) Applicant: Honda Motor Co., Ltd., Tokyo (JP)

(72) Inventors: Alper Ayvaci, Santa Clara, CA (US); Kai-Chi Chan, West Lafayette, IN (US); Bernd Heisele, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/690,394

(22) Filed: Aug. 30, 2017

(65) Prior Publication Data

US 2018/0005025 A1 Jan. 4, 2018

Related U.S. Application Data

(63) Continuation of application No. 14/641,506, filed on Mar. 9, 2015, now Pat. No. 9,785,828.

(Continued)

(51) Int. Cl.
*G06K 9/00* (2006.01)
*G06T 15/00* (2011.01)
(Continued)

(52) U.S. Cl.
CPC ..... *G06K 9/00362* (2013.01); *G06K 9/00805* (2013.01); *G06K 9/4638* (2013.01); *G06K 9/4642* (2013.01); *G06K 9/6296* (2013.01)

(58) Field of Classification Search
None
See application file for complete search history.

(56) References Cited

U.S. PATENT DOCUMENTS 7,227,893 B1 6/2007 Srinivasa et al.
8,538,081 B2 9/2013 Ding et al.
(Continued)

FOREIGN PATENT DOCUMENTS

WO 2011154558 12/2011
WO 2014037709 3/2014

OTHER PUBLICATIONS

Anuj Mohan et al., Example-Based Object Detection in Images by Components, IEEE Transactions on Pattern Analysis and Machine Intelligence, Apr. 2001, vol. 23, No. 4.

(Continued)

*Primary Examiner* — Randolph I Chu
(74) *Attorney, Agent, or Firm* — Rankin, Hill & Clark LLP

(57) ABSTRACT

A method for partially occluded object detection includes obtaining a response map for a detection window of an input image, the response map based on a trained model and including a root layer and a parts layer. The method includes determining visibility flags for each root cell of the root layer and each part of the parts layer. The visibility flag is one of visible or occluded. The method includes determining an occlusion penalty for each root cell with a visibility flag of occluded and for each part with a visibility flag of occluded. The occlusion penalty is based on a location of the root cell or the part with respect to the detection window. The method determines a detection score for the detection window based on the visibility flags and the occlusion penalties and generates an estimated visibility map for object detection based on the detection score.

20 Claims, 8 Drawing Sheets

Related U.S. Application Data

(60) Provisional application No. 62/008,675, filed on Jun. 6, 2014.

(51) Int. Cl.
  *G06K 9/46* (2006.01)
  *G06K 9/62* (2006.01)

(56) References Cited

U.S. PATENT DOCUMENTS

| | | |
|---|---|---|
| 8,619,082 B1 | 12/2013 | Ciurea et al. |
| 8,811,663 B2 | 8/2014 | Brown et al. |
| 8,958,600 B2 | 2/2015 | Othmezouri et al. |
| 2002/0031265 A1 | 3/2002 | Higaki |
| 2006/0165268 A1 | 7/2006 | Kaus et al. |
| 2008/0075367 A1 | 3/2008 | Winn et al. |
| 2008/0123968 A1 | 5/2008 | Nevatia et al. |
| 2009/0034793 A1 | 2/2009 | Dong et al. |
| 2009/0185715 A1 | 7/2009 | Hofhauser et al. |
| 2012/0076408 A1 | 3/2012 | Suk et al. |
| 2012/0263346 A1 | 10/2012 | Datta et al. |
| 2013/0142390 A1 | 6/2013 | Othmezouri et al. |
| 2013/0259307 A1 | 10/2013 | Torii et al. |
| 2014/0119654 A1 | 5/2014 | Taylor et al. |
| 2014/0133742 A1 | 5/2014 | Xiao et al. |
| 2014/0169663 A1 | 6/2014 | Han et al. |
| 2015/0117773 A1 | 4/2015 | Kamiya |

OTHER PUBLICATIONS

Mohammad Norouzi et al., Stacks of Convolutional Restricted Boltzmann Machines for Shift-Invariant Feature Learning, 978-4244-3991-1/09/$25.00 2009 IEEE, pp. 2735-2742.

Patrick Ott et al., Detection of Partially Visible Objects, arXiv:1311.6758v1 [cs/CV] Nov. 24, 2013.

Wanli Ouyang et al., A Discriminative Deep Model for Pedestrian Detection with Occlusion Handling, 978-1-4673-1228-8/12/$31.00 2012 IEEE, pp. 3258-3265.

Siyu Tang et al., Detection and Tracking of Occluded People, http://dx.doi.org/10.5244/C.26.9, pp. 1-11.

Andrea Vedaldi et al., Quick Shift and Kernel Methods for Mode Seeking, pp. 1-14.

Bo Wahlberg et al., An ADMM Algorithm for a Class of Total Variation Regularized Estimation Problems, arXiv:1203.1828v1 [stat.ML} Mar. 8, 2012.

Xiaoyu Wang et al., An HOG-LBP Human Detector with Partial Occlusion Handling, pp. 1-8.

Junjie Yan et al., Robust Multi-Resolution Pedestrian Detection in Traffic Scenes, CVPR2013, pp. 3033-3040.

Shanshan Zhang et al., Informed Haar-like Features Improve Pedestrian Detection, 8 pages.

Tobias Baumgartner et al, Tracking People and Their Objects, 8 pages.

Dorin Comaniciu et al., Mean Shift: A Robust Approach Toward Feature Space Analysis, IEE Transactions on Pattern Analysis and Machine Intelligence, May 2002, vol. 24, No. 5.

Chaitanya Desai et al., Detecting Actions, Poses, and Objects with Relational Phraselets, 14 pages.

Piotr Dollar et al., Pedestrian Detection: An Evaluation of the State of the Art, Submission to IEEE Transactions on Pattern Analysis and Machine Intelligence, pp. 1-20.

Markus Enzweiler et al., Multi-Cue Pedestrian Classification with Partial Occlusion Handling, 8 pages.

Andreas Ess et al., Depth and Appearance for Mobile Scene Analysis, 8 pages.

Navneet Dalal et al., Histograms or Oriented Gradients for Human Detection, 8 pages.

Pedro F. Felzenszwalb et al., Object Detection with Discriminatively Trained Part Based Models, 20 pages.

Tianshi Gao et al., A Segmentation-aware Object Detection Model with Occlusion Handling, pp. 1361-1368.

Bernd Heisele et al., Categorization by Learning and Combining Object Parts, 7 pages.

Markus Mathias et al., Handling Occlusions with Franken-classifiers, 14 pages.

K. Mikolajczyk et al., Human Detection Based on a Probabilistic Assembly of Robust Part Detectors, ECCV 2004, LNCS 3021, pp. 69-82, 2004.

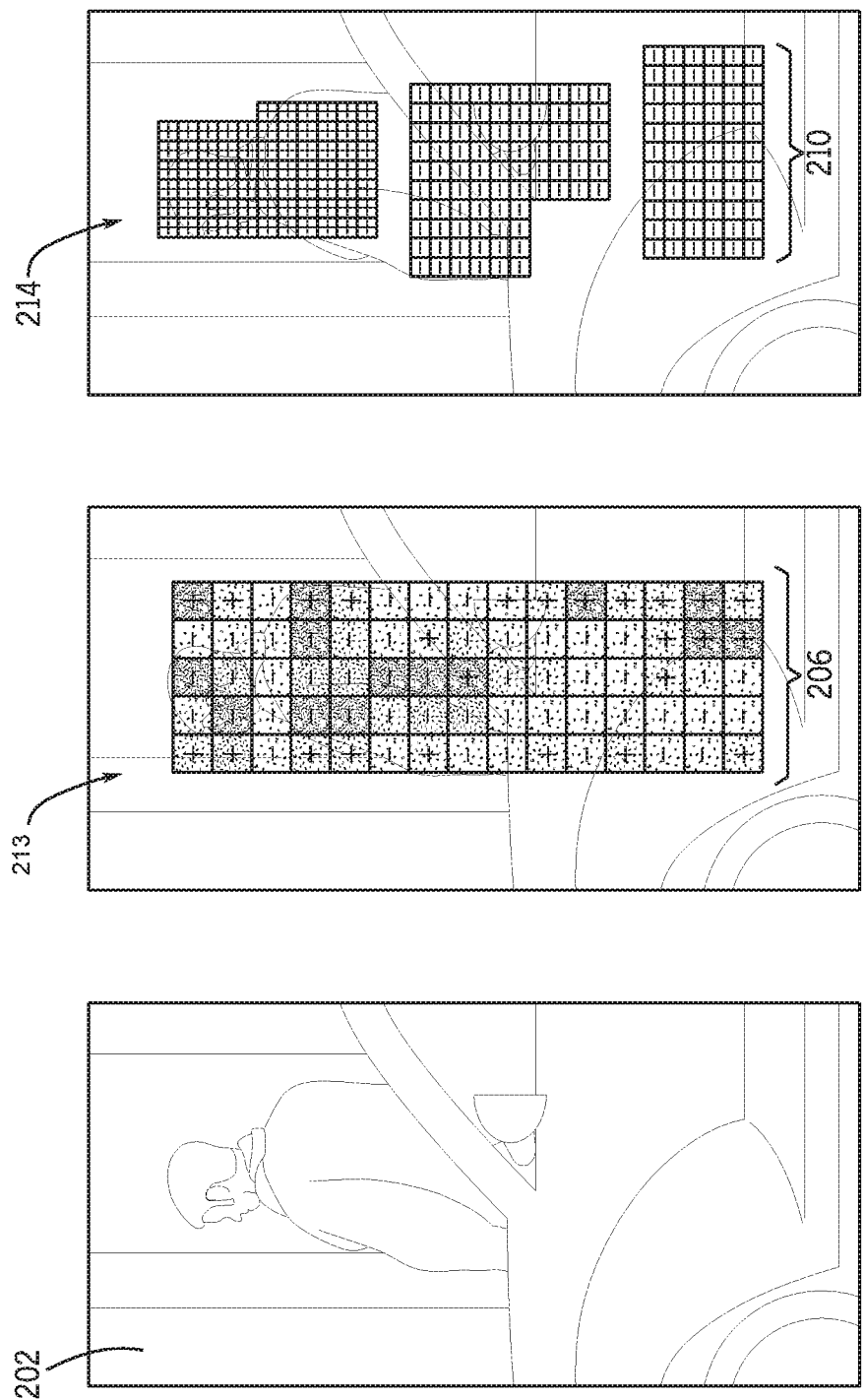

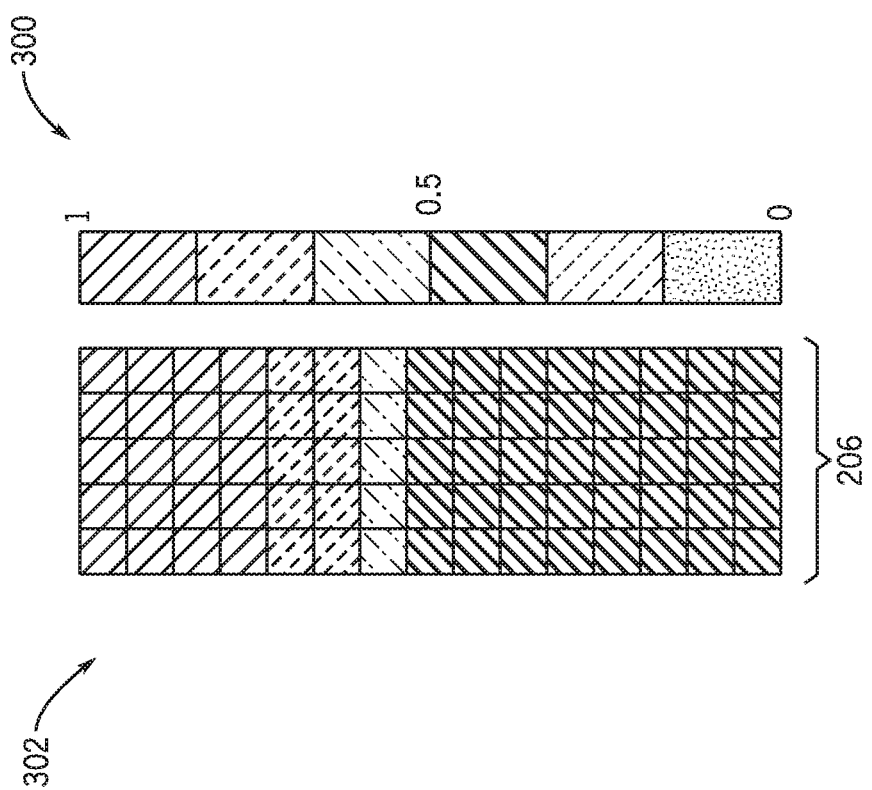

SYSTEM AND METHOD FOR PARTIALLY OCCLUDED OBJECT DETECTION

RELATED APPLICATIONS

This application is a continuation of U.S. application Ser. No. 14/641,506 filed on Mar. 9, 2015 and now published as US 2016/0180192, which is expressly incorporated herein by reference. U.S. application Ser. No. 14/641,506 claims priority to U.S. Provisional Application Ser. No. 62/008,675 filed on Jun. 6, 2014, which is also expressly incorporated herein by reference.

BACKGROUND

Vision-based Advanced Driver Assistance Systems (ADAS) assist drivers during the driving process to increase vehicle and road safety. Some examples of ADAS can include, but are not limited to, in-vehicle navigation systems, Adaptive Cruise Control (ACC) systems, lane departure warning (LDW) systems, collision avoidance systems, automatic parking systems, and blind spot indicator (BSI) systems.

Modern ADAS rely on computer vision based pedestrian detection for accident prevention. Sensors can be equipped in vehicles to collect data from the vehicle surroundings and decision can be made based on sensory data. Sensors for detecting pedestrians can be cameras that capture images of vehicle surroundings (e.g., a driving scene). In these images, pedestrians can be partially occluded by objects, such as cars, trees, shrubbery, signs, among others. Determining whether a region in a driving scene belongs to a target object or an occluded object facilitates ADAS and can help save lives by preventing fatal accidents with pedestrians. Accordingly, ADAS can use computer vision techniques, for example, techniques based on a deformable parts model (DPM) to detect partially occluded pedestrians.

BRIEF DESCRIPTION

According to one aspect, a computer-implemented method for partially occluded object detection includes obtaining a response map for a detection window of an input image. The response map is based on a trained model and the response map includes a root layer and a parts layer. The method includes determining visibility flags for each root cell of the root layer and each part of the parts layer based on the response map. The visibility flags are one of visible or occluded. The method includes determining an occlusion penalty for each root cell with a visibility flag of occluded and for each part with a visibility flag of occluded. The occlusion penalty is based on a location of the root cell or the part with respect to the detection window. The method includes determining a detection score for the detection window based on the visibility flags and the occlusion penalties and generating an estimated visibility map for object detection based on the detection score.

According to another aspect, a system for partially occluded object detection includes an image input device. The image input device receives an input image. The system includes an object detector. The object detector determines a response map for a detection window of the input image. The object detector determines the response map based on a trained model and the response map includes a root layer and a parts layer. The system includes a processor operatively connected for computer communication to the image input device and the object detector. A visibility flag module of the processor determines visibility flags for each root cell of the root layer and each part of the parts layer based on the response map. The visibility flag is one of visible or occluded and the visibility flag module of the processor determines an occlusion penalty for each root cell with a visibility flag of occluded and for each part with a visibility flag of occluded. The occlusion penalty is based on a location of the root cell or the part with respect to the detection window. The object detector determines a detection score for the detection window based on the visibility flags and the occlusion penalties and generates an estimated visibility map for object detection based on the detection score.

According to a further aspect, a computer-implemented method for partially occluded object detection includes obtaining a response map for a detection window of an input image. The response map is based on a trained model and the response map includes a root layer and a parts layer. The method includes determining visibility flags for each root cell of the root layer and each part of the parts layer based on the response map. The visibility flag is one of visible or occluded. The method includes determining a detection score for the detection window based on the visibility flags. The detection score excludes root cells and parts with a visibility flag of occluded. The method includes generating an estimated visibility map for object detection based the detection score.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2B is the exemplary input image of FIG. 2A illustrating a detailed view of a response map for the root cell layer of the input image and a response map of the parts layer of the input image according to an exemplary embodiment;

FIG. 3 is an exemplary occlusion penalty scale and an application of the occlusion penalty scale to the root cell layer shown in FIG. 2A according to an exemplary embodiment;

DETAILED DESCRIPTION

Figure 1:
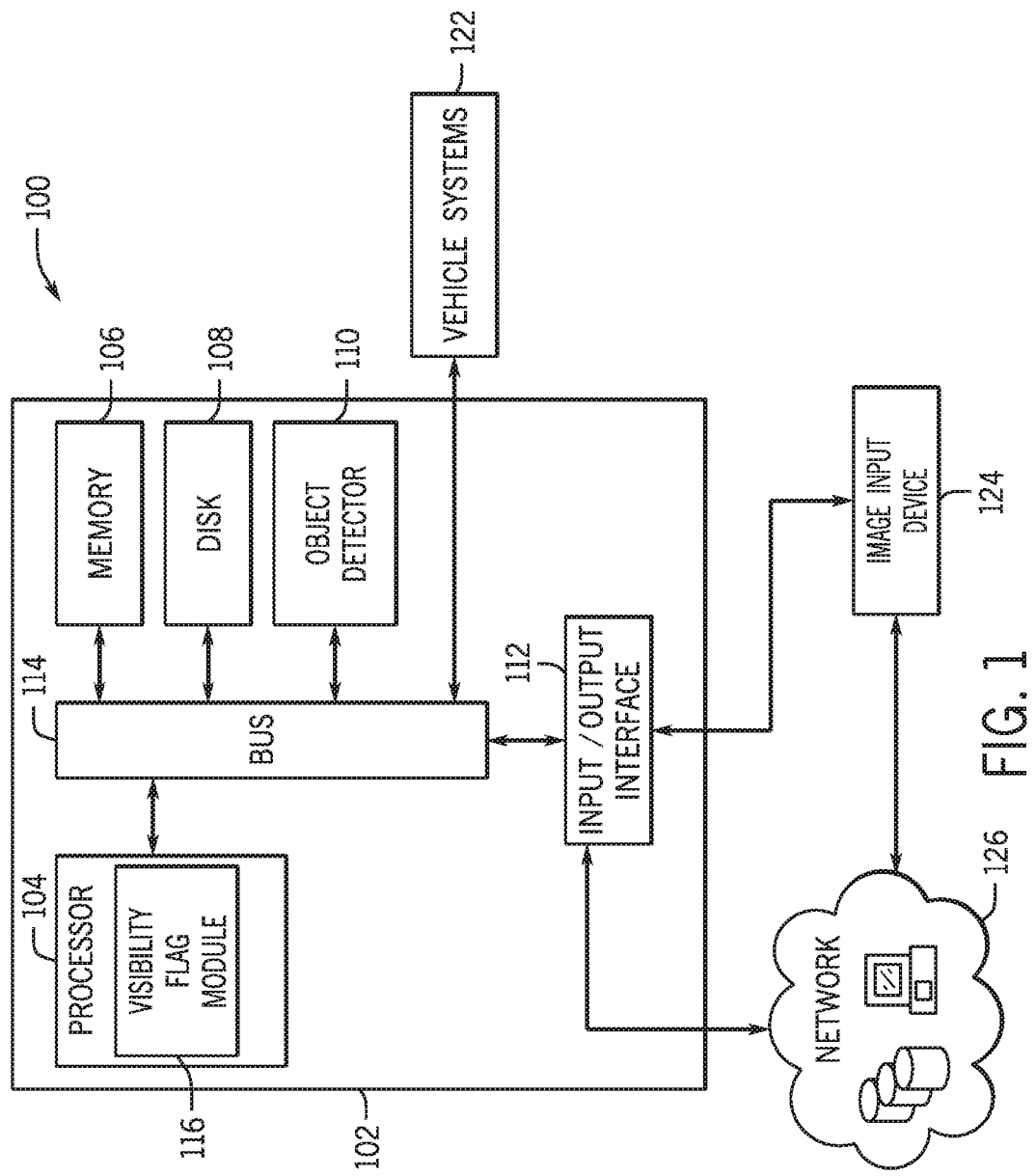
FIG. 1 is a schematic diagram of an illustrative operating environment for implementing systems and methods for partially occluded object detection according to an exemplary embodiment.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

I. System Overview

Generally, the systems and methods disclosed herein are directed to detecting partially occluded objects (e.g., pedestrians) in a vehicle scene based on a deformable part model (DPM) and applying visibility flags so that a detection score of a partially occluded object is not affected by occluded regions. Referring now to the drawings, wherein the showings are for purposes of illustrating one or more exemplary embodiments and not for purposes of limiting same, FIG. 1 is a schematic diagram of an operating environment 100 for implementing systems and methods for partially occluded object detection. The components of environment 100, as well as the components of other systems, hardware architectures, and software architectures discussed herein, can be combined, omitted, or organized into different architectures for various embodiments. Further, the components of the operating environment 100 can be implemented with or associated with a vehicle (not shown) for partially occluded pedestrian detection by, for example, an Advanced Driver Assistance Systems (ADAS).

In the illustrated embodiment of FIG. 1, the environment 100 includes a vehicle computing device 102 (VCD) with provisions for processing, communicating and interacting with various components of a vehicle and other components of the environment 100. In one embodiment, the VCD 102 can be integrated as part of a telematics unit, a head unit, a navigation unit, an infotainment unit, an electronic control unit, among others (not shown). In other embodiments, the components and functions of the VCD 102 can be implemented remotely from a vehicle, for example, with a portable device (not shown) or another device connected via a network (e.g., a network 126).

Generally, the VCD 102 includes a processor 104, a memory 106, a disk 108, an object detector 110, and an input/output (I/O) interface 112, which are each operably connected for computer communication via a bus 114 and/or other wired and wireless technologies. The I/O interface 112 provides software and hardware to facilitate data input and output between the components of the VCD 102 and other components, networks, and data sources, which will be described herein. Additionally, the processor 104 includes a visibility flag module 116 suitable for providing partially occluded object detection facilitated by the components of the environment 100.

The VCD 102 is also operably connected for computer communication (e.g., via the bus 114 and/or the I/O interface 112) to one or more vehicle systems 122. Vehicle systems can include, but are not limited to, any automatic or manual systems that can be used to enhance the vehicle, driving, and/or safety. For example, the vehicle systems 122 can include, but are not limited to, ADAS that can rely on computer vision based pedestrian detection for accident prevention. The vehicle systems 122 can include and/or are operably connected for computer communication to various vehicle sensors (not shown), which provide and/or sense information associated with the vehicle, the vehicle environment, and/or the vehicle systems 122.

The VCD 102 is also operatively connected for computer communication to an image input device 124 and, as mentioned above, the network 126. The connection from the I/O interface 112 to the image input device 124 and the network 126 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination thereof.

The image input device 124 receives an input image. The image input device 124 can be any type of image sensor and/or device to capture an image and/or a video. In some embodiments, the image input device 124 is part of a vehicle system 122, a computer vision system (not shown), or a stereo image system. In other embodiments, the image input device 124 is a remote device accessed, for example, via the network 126. The network 126 is, for example, a data network, the Internet, a wide area network or a local area network. The network 126 serves as a communication medium to various remote devices (e.g., databases, web servers, remote servers, application servers, intermediary servers, client machines, other portable devices).

Figure 2A:
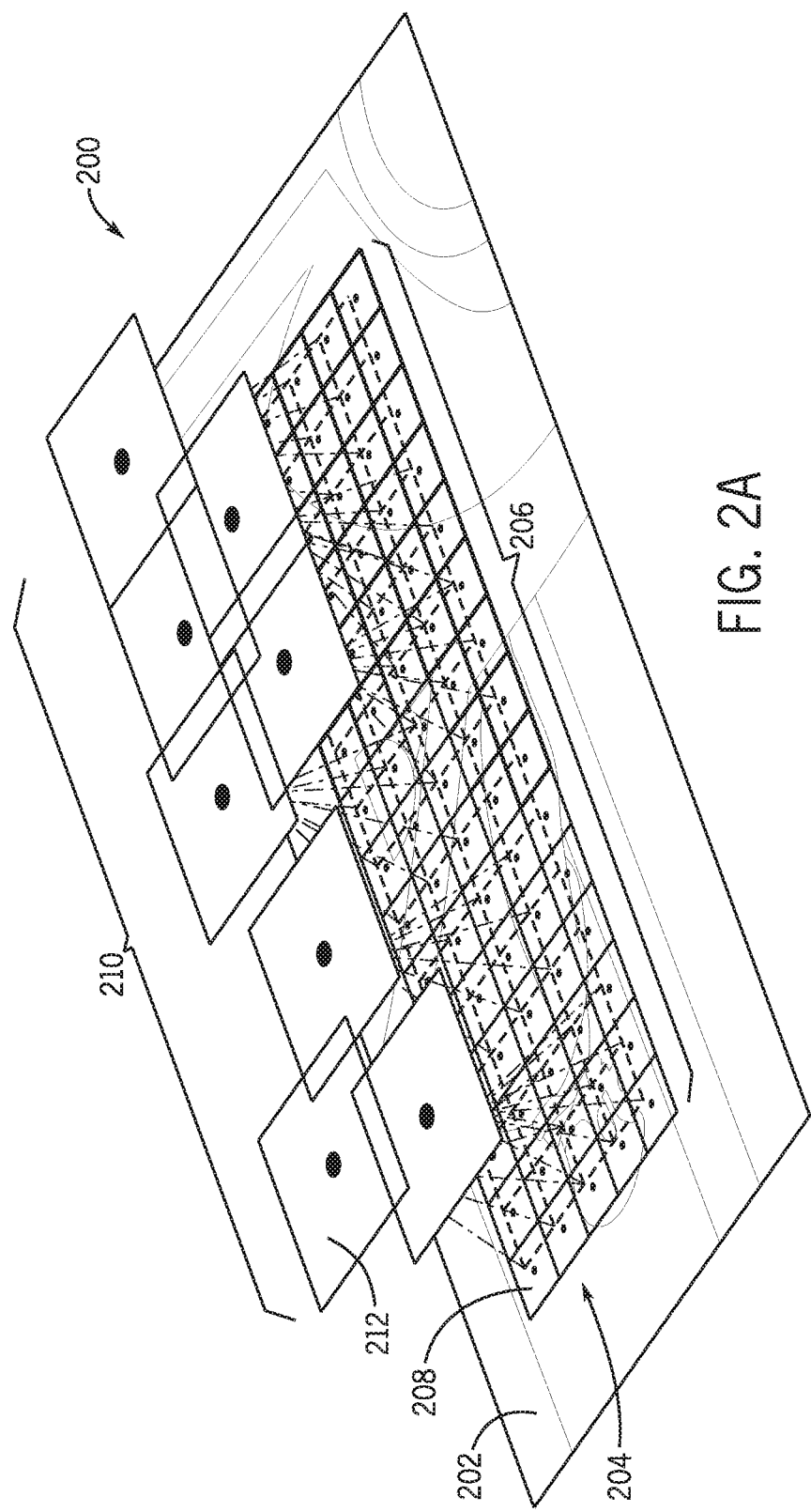
FIG. 2A is a schematic view of an illustrative input image with a simplified view of a response map based on a trained model and including a root cell layer and a parts layer according to an exemplary embodiment.
Figure 2C:
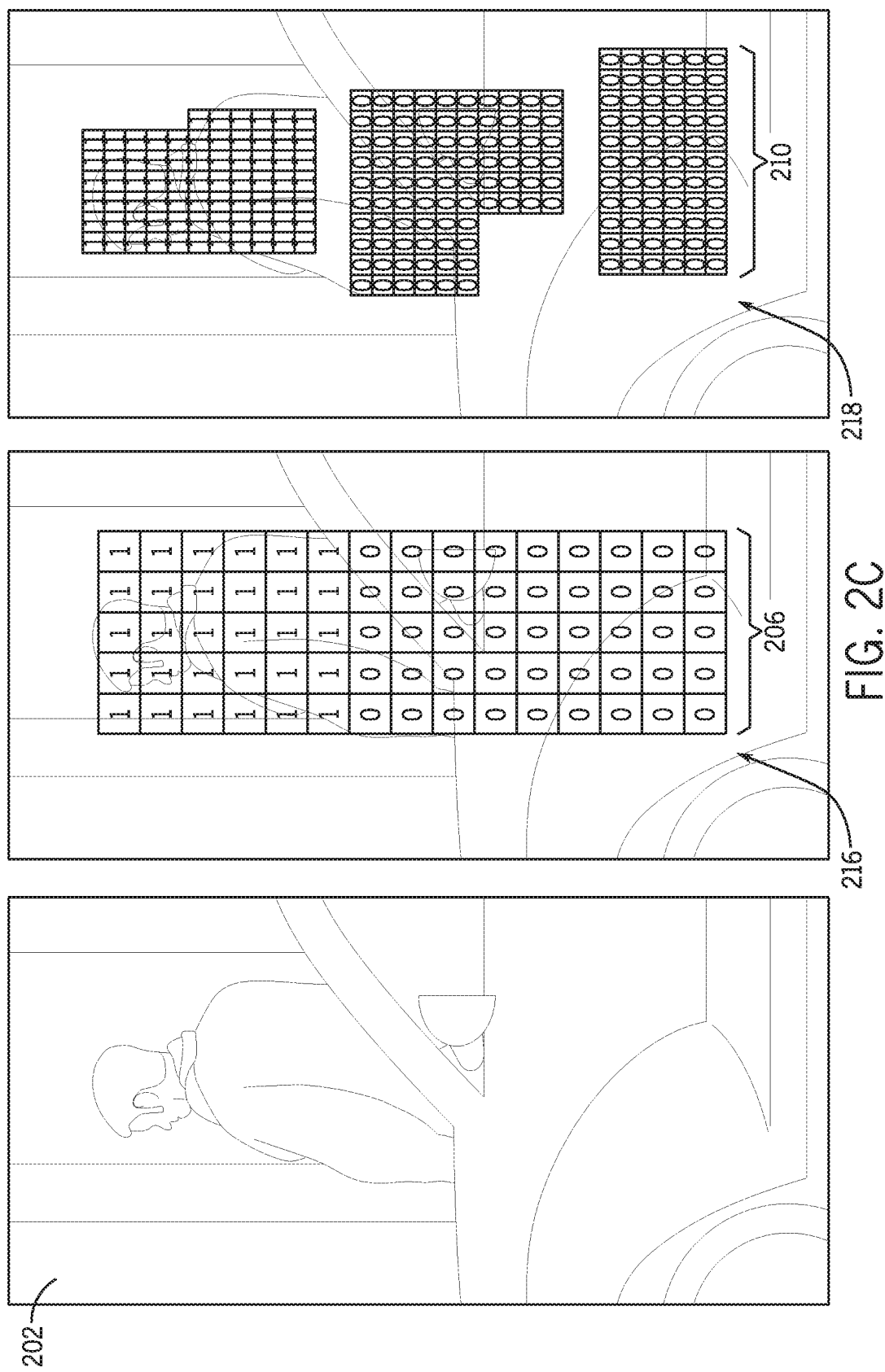
FIG. 2C is the exemplary input image of FIG. 2A illustrating a detailed view of visibility flags attached to the root cell layer of the input image and the parts layer of the input image according to an exemplary embodiment.

The system shown in FIG. 1 will now be described in operation according to an exemplary embodiment. As mentioned above, the system includes an image input device. The image input device receives an input image. For example, in FIG. 1, the image input device 124 receives an input image. The input image can be, for example, a vehicle scene image that includes a pedestrian or other objects for object detection. FIGS. 2A, 2B and 2C, which will be described in more detail herein, illustrate an exemplary input image 202. In one embodiment, the object detector determines the response map based on a trained model and the response map includes a root layer and a parts layer.

As shown in FIG. 1, the object detector 110 can determine and/or obtain a response map for a detection window of the input image. Referring now to FIG. 2A, an exemplary simplified view of a response map 200 is shown for a detection window 204 of the input image 202. As will be discussed herein, according to a trained model (e.g., deformable parts model), the detection window 204 is a sliding window used for object categorization and detection based on the trained model. Although the methods and systems described herein will refer to a single detection window, an input image for object detection can have more than one detection window. In FIG. 2A, the response map 200 includes a root layer 206 with several root cells (e.g., root cell 208), a parts layer 210 with several parts (e.g., part 212). The parts are drawn above the root cells. The root layer 206 and the parts layer 210 are determined based in part on the trained model.

FIG. 2A also illustrates a consistency graph between the root cells and the parts. The root cells (e.g., root cell 208) are represented by the squares on the input image 202 in the root cell layer 206. The parts (e.g., part 212) in the parts layer 210 are drawn above the root cells. The lines between the root cells and the parts indicate cell-to-part consistency, which is described in more detail herein. Further, the dotted lines shown on the root cell layer 206 indicate cell-to-cell consistency, which will be described in more detail herein.

FIG. 2B illustrates the exemplary input image 202 of FIG. 2A with a detailed view of a response map for the root cell layer 206 of the input image 202 and a response map of the parts layer 210 of the input image 202 according to an exemplary embodiment. Specifically, the input image 202 in FIG. 2B illustrates the input image 202 prior processing for partially occluded object detection (e.g., as received by the input image device 124). A response map 213 is the response map for the root cell layer 206 of the input image 202. Here, each root cell includes a positive (+) or a negative (−) cell level response score. The cell level response score can also include a value. Similarly, a response map 214 is the response map for the parts layer 210 of the input image 202. Here, each part includes a positive (+) or a negative (−) parts response score. The parts response score can also include a value. In FIG. 2B, the patterns shown in each root cell can indicate a magnitude of the response score. For example, a darker pattern of a condensed pattern could indicate a higher magnitude than a lighter pattern of a less condensed pattern.

Referring again to FIG. 1, and as discussed above, the object detector 110 determines the response map, the cell level response scores and the parts scores discussed above, based on a trained model. The trained model (not shown) can be stored at, for example, the memory 106 and/or the network 126. The trained model uses data (e.g., templates) to learn the relationships between observed image data (e.g., the input image) and estimated aspects of the image data and the image scene to make new inferences about the image scene from the image data.

For example, in one embodiment, the trained model is a deformable parts model (DPM). See P. F. Felzenszwalb, R. B. Girshick, D. McAllester, and D. Ramanan, *Object detection with discriminatively trained part-based models*, IEEE Transactions on Pattern Analysis and Machine Intelligence, 32(9):1627-1645, September 2010. DPM is a sliding window technique for object categorization and detection based on the trained model. Thus, during DPM, an input image is separated into one or more detection windows and DPM analysis is performed on each detection window. Specifically, DPM may contain a coarse root filter (whole body) and several higher-resolution part filters (body parts). During the detection process, a valuation of the histograms-of-oriented-gradients (HOG) features may be extracted from detection windows. See N. Dalal and B. Triggs, *Histograms of oriented gradients for human detection*, IEEE Conference on Computer Vision and Pattern Recognition, volume I, pages 886-893, June 2005. For each detection window, its score may be computed by summing the responses of the root and part filters, and a displacement penalty of each part filter. Detection windows with scores higher than a threshold can be considered to be images of pedestrians. Although the systems and methods described herein utilized DPM, other trained models can be implemented.

Referring again to FIG. 1, the system also includes a processor operatively connected for computer communication to the image input device and the object detector. As mentioned above, the processor 104 is operatively connected for computer communication (e.g., via the I/O interface 112 and/or the network 126) to the image input device 124 and the object detector 110. Further, the processor 104 can include the visibility flag module 116. The visibility flag module 116 determines visibility flags for each root cell of the root layer and each part of the parts layer based on the response map. The visibility flag indicates if the root cell or the part is occluded or visible. Specifically, the visibility flag is one of visible or occluded and the visibility flag module 116 attaches the determined visibility flag to each root cell and each part. In some embodiments, the visibility flag is a binary value, however the visibility flag can include other types of values.

Referring now to FIG. 2C, the exemplary input image 202 of FIG. 2A and FIG. 2B is shown with a detailed view of visibility flags attached to the root cell layer of the input image and the parts layer of the input image according to an exemplary embodiment. Specifically, the input image 202 in FIG. 2C illustrates the input image 202 prior processing for partially occluded object detection. Visibility flags attached to root layer 206 of the input image 202 is generally shown by element number 216. Similarly, visibility flags attached to parts layer 210 of the input image 202 is generally shown by element number 218. Here, the visibility flags are binary values where the value 1 indicates a visible root cell/part and the value 0 indicates an occluded root cell/part.

Referring again to FIG. 1, the visibility flag module 116 of the processor determines an occlusion penalty for each root cell with a visibility flag of occluded and for each part with a visibility flag of occluded. In one embodiment, the occlusion penalty is based on a location of the root cell or the part with respect to the detection window. Referring now to FIG. 3, an exemplary occlusion penalty scale and an application of the occlusion penalty scale to the root cell layer 206 of FIG. 2A is shown according to an exemplary embodiment. An occlusion penalty scale 300 is shown with values ranging from 1 to 0. Other values and scales can also be implemented. An application of the occlusion penalties to each root cell of the root cell layer 206 is indicated by number 302. In one embodiment, and as shown in the application of the occlusion penalty scale to the root cell layer 206, the occlusion penalties are lower for root cells and parts in a lower part of the detection window. As will be discussed in further detail herein, the occlusion penalties can be modeled by a sigmoid function. Further, although FIG. 3 illustrates occlusions for root cells, the occlusion penalty scale 300 can also apply to parts of a parts layer.

Referring again to FIG. 1, the object detector 110 determines a detection score for the detection window based on the visibility flags and the occlusion penalties. Further, the object detector 110 generates an estimated visibility map for object detection based on the detection score. In one embodiment, the object detector 110 determines the detection score for the detection window based on a cell level response score of each root cell in the root cell layer and parts response score based on each part of the parts layer. As discussed above with FIG. 2B, the cell level response score of each root cell in the root cell layer and the parts response score are determined based on the input image and the trained model and can be part of a response map.

The object detector 110 can adjust the detection score based on a root cell penalty and a parts penalty, wherein the root cell penalty and the parts penalty are based at least in part on the location of the root cell and the part relative to the detection window. In one embodiment, the root cell penalty and the parts penalty are lower for root cells and parts in a lower part of the detection window. In this way, the detection score of an input image including a partially occluded object (e.g., a pedestrian) is generally not affected by occluded regions.

Further, in another embodiment, the visibility flag module 116 of the processor compares a deformable parts model (DPM) detection score to a predetermined threshold. If the deformable parts model detection score meets the predetermined threshold, the visibility flag module of the processor estimates visibility flags for the detection window. Accordingly, in FIG. 1, the visibility flag module 116 compares the detection score for a detection window to a predetermine threshold, the detection score received from the object detector 110. If the detection score meets the predetermined threshold, the visibility flag module 116 determines visibility flags for each root cell of the root layer and each part of the parts layer for the detection window. Thus, only detection windows that have a high probability of including an object are processed with visibility flags.

II. Exemplary Methods

Figure 4:
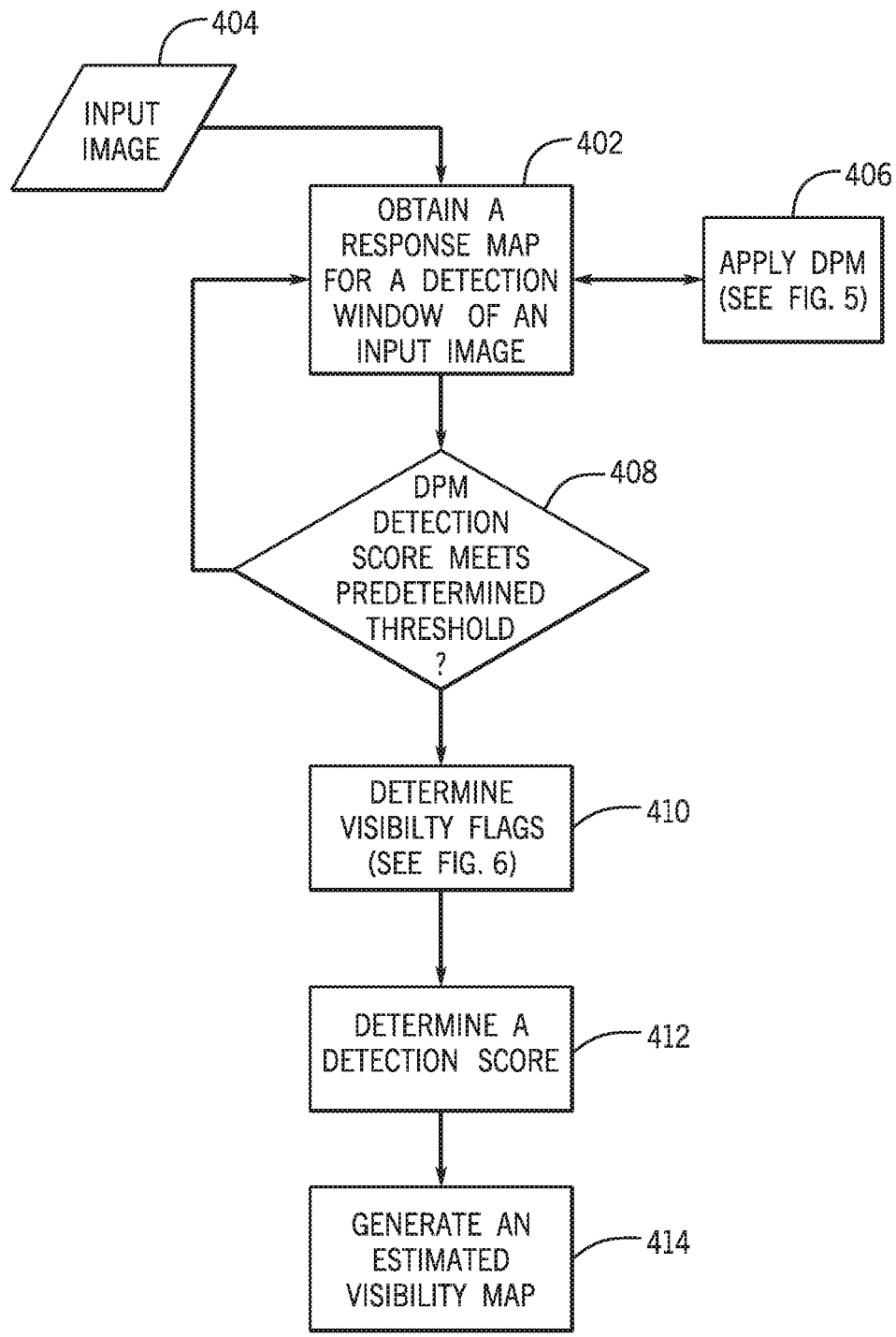
FIG. 4 is an exemplary process flow diagram of a method for partially occluded object detection according to an exemplary embodiment.

Referring now to FIG. 4, a method for partially occluded object detection according an exemplary embodiment will be discussed. FIG. 4 will be described with reference to the components of FIGS. 1, 2A, 2B, 2C and 3. Additionally, the methods with be described with reference to algorithms, which can also be implemented with the system described above of FIG. 1 and other systems and methods. At block 402, the method includes obtaining a response map for a detection window of an input image. As shown in FIG. 4, an input image 404 can be received for obtaining the response map at block 402. In one embodiment, the object detector 110 determines a response map for a detection window of the input image. The input image 404 can be received from the input image device 124. For example, the input image 404 can be part of a vehicle scene capture by an input image device associated with a vehicle system 122. The input image 404 can include a partially occluded object. For example, input image 202 as shown in FIGS. 2A, 2B and 2C includes a pedestrian partially occluded by a vehicle.

The response map is based on a trained model. The trained model (not shown) can be stored at, for example, the memory 106 and/or the network 126. The trained model uses data (e.g., templates) to learn the relationships between observed image data (e.g., the input image) and estimated aspects of the image data and the image scene to make new inferences about the image scene from the image data. For example, in one embodiment, the trained model is a deformable parts model (DPM). Further, the response map includes a root layer and a parts layer. As discussed above with FIGS. 2A, 2B and 2C the response map 200 can include a root layer 206 and a parts layer 210.

Figure 5:
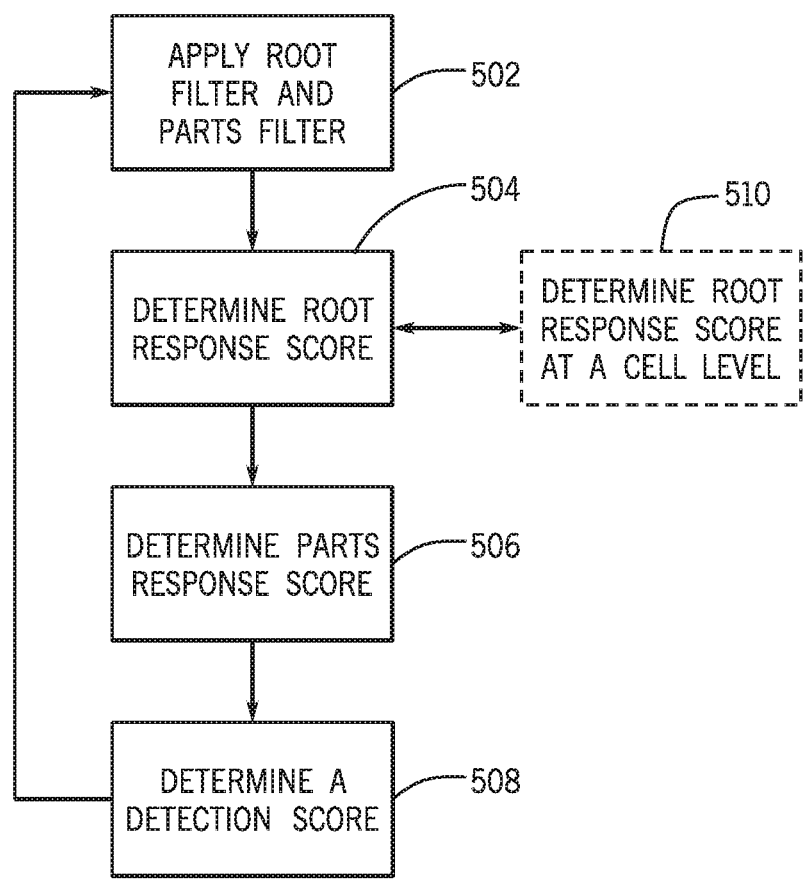
FIG. 5 is an exemplary process flow diagram of a method for applying a deformable parts model to determine a response map for an input image according to an exemplary embodiment.

At block 406, the method can include applying DPM to the input image. Referring now to FIG. 5, a process flow diagram is shown for a method of applying DPM to determine a response map for an input image according to an exemplary embodiment. Obtaining the response map can include determining a cell level response score for each root cell and a parts response score for each part. Accordingly, root filter and parts filters are applied to the input image. Specifically, at block 502, the method includes applying a root filter and a parts filter. A linear deformable parts model consists of a root filter $F_0 \in \mathbb{R}^{w_0 \times h_0 \times d}$, its bias term $b_0$, a set of part filters $F_p \in \mathbb{R}^{w_p \times h_p \times d}$, where p=1 ... P, the associated bias terms $\{b_p\}_{p=1}^{P}$ and deformation coefficients $\delta_p$. Here, d is the number of HOG features computed in a cell, $w_0$ and $h_0$ are the width and height of a detection window in terms of cells. Similarly, $w_p$ and $h_p$ are the width and height of the detector for the part p.

Accordingly, given a detection window at a position x with scale s, the root filter can be expressed as:

$$R(x,s) = F_0^T \cdot H(x,s) + b_0 \quad (1)$$

where $H(x,s) \in \mathbb{R}^{w_0 \times h_0 \times d}$ is the concatenation of the HOG (histogram of oriented gradients) features that are computed on the root cells inside the detection window. Thus, equation (1) above, will give a root cell response score at block 504. However, in one embodiment, at block 510, the method includes determining a root response score at a cell level. Accordingly, based on equation (1), the root response scores at a cell level are determined as:

$$R_0(x,s) = \Sigma_{c=1}^{C} [(F_0^c)^T \cdot H^c(x,s) + b_0^c] = \Sigma_{c=1}^{C} R_0^c(x,s) \quad (2)$$

Where $C = w^0 \times h^0$ is the number of root cells and $b_0 = \Sigma_c b_0^c$. Additionally, $F_0^c \in \mathbb{R}^d$ and $H^c(x,s) \in \mathbb{R}^d$. As shown in FIG. 2B, cell level response scores (e.g., +, − response scores) are shown for each root cell of the root layer 206.

Referring again to the method of FIG. 5, at block 506, the method includes determining a parts response score for each part. The response score for each part can be expressed as:

$$R_p(x,s) = \max_{dx \in X} (F_p^T \cdot H^p(x+dx,s) + b_p - (\delta_p)^T \cdot \emptyset(dx)) \quad (3)$$

where $X \subset \mathbb{Z}^2$ is the search neighborhood around the expected position of the part p, and $\emptyset(dx) = [dx_1, dx_1^2, dx_2, dx_2^2]^T$. As shown in FIG. 2B, parts response scores (e.g., +, − response scores) are shown for each part of the parts layer 210.

At block 508, the method includes determining a detection score for the detection window. The detection score for the detection window combines the responses from equations (2) and (3) as:

$$R(x,s) = \Sigma_{c=1}^{C} R_0^c(x,s) + \Sigma_{p=1}^{P} R_p(x,s) \quad (4)$$

Referring again to the method of FIG. 4, in one embodiment, at block 408, the method includes determining if the DPM detection score (i.e., equation (4)) meets a predetermined threshold. Since the number of detection windows in an image can be large, visibility flags (e.g., determined at block 410) are determined for detections windows within a predetermined threshold. For example, in one embodiment, visibility flags are determined for the top 10% of the detection windows based on the DPM detection score. Thus, if the determination at block 408 is YES, the method includes at block 410, determining visibility flags for each root cell of the root layer and each part of the parts layer based on the response map. In one embodiment, the visibility flag is one of visible or occluded. Thus, the visibility flag indicates if a target object (e.g., a pedestrian) is visible or occluded by another object. As will be discussed in more detail herein, in one embodiment, determining visibility flags for each root cell is based on the cell level response score and a location of the root cell relative to adjacent root cells. Further, in another embodiment, determining visibility flags for each part is based on the part response score and a location of the part relative to overlapping root cells.

Figure 6:
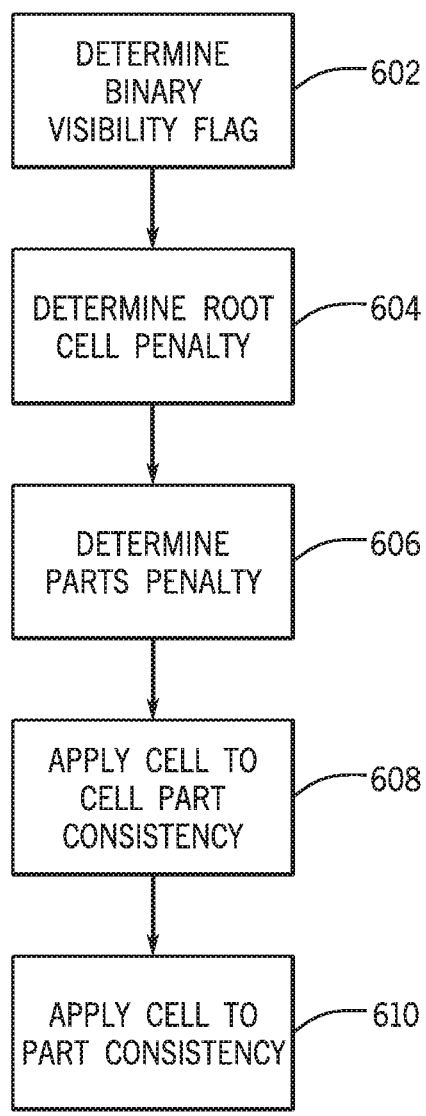
FIG. 6 is an exemplary process flow diagram of a method for estimating visibility flags according to an exemplary embodiment.

Referring now to FIG. 6, a process flow diagram of a method for estimating visibility flags is shown according to an exemplary embodiment. When an object is partially occluded, root and part filters in the occluded regions can produce negative responses that mislead the object detector 110 and prevent the object detector 110 from recognizing the target object. Thus, visibility flags are determined and attached to each root cell and part that is determined to be occluded. Accordingly, at block 602, the method includes determining visibility flags for each root cell of the root layer and each part of the parts layer based on the response map. The visibility flag is one of visible or occluded. For example, as shown in FIG. 2C, the visibility flag can be a binary value where 0 indicates an occluded root cell and/or part, and 1 indicates a visible root cell and/or part.

By attaching a visibility flag to each root cell and part that takes the value of occluded (e.g., 0), response scores are aggregated for a detection window only on visible regions of the target object and not on the occluded regions. Initially, to determine the visibility of the cells and the parts, an optimization problem can be solved to maximize the detection score as determined by equation (4). More specifically, this can be expressed as:

$$\tilde{v_0}, \{\tilde{v_p}\}_{p=1}^{P} = \arg\max_{v_0, \{v_p\}} \sum_{c=1}^{C} R_0^c v_0^c + \sum_{p=1}^{P} R_p v_p \quad (5)$$

where $v_0 = [v_0^0 \ldots v_0^C]^T$ and $\{v^p\}_{p=1}^{P}$ are root cell and part visibility flags. Initially, the determination as to which root cells and parts are visible and or occluded can be based on the root cell responses and the parts responses. In one embodiment, the root cell responses and part responses can be compared to a predetermined threshold. For example, for root cells, the thresholds can be expressed as:

$$\tilde{v_0^c} = \begin{cases} 0, & \text{if } R_0^c \leq 0 \\ 1, & \text{if } R_0^c \geq 0 \end{cases} \quad \tilde{v_p} = \begin{cases} 0, & \text{if } R_p \leq 0 \\ 1, & \text{if } R_p \geq 0 \end{cases}$$

Referring again to FIG. 6, at block 604, the method includes determining a root cell penalty, and at block 605, the method includes determining a parts penalty. More specifically, the method includes determining an occlusion penalty for each root cell with a visibility flag of occluded and for each part with a visibility flag of occluded. In one embodiment, the occlusion penalty is based on a location of the root cell or the part with respect to the detection window.

Thus, for example, in one embodiment, the occlusion penalty is lower for root cells and parts located in a lower part of the detection window than root cells and parts located in a higher part of the detection window.

The occlusion penalties for each root cell and each part can be expressed as:

$$R_{occ} = \max_{v_0, \{v_p\}_{p=1}^{P}} \sum_{c=1}^{C} [R_0^c v_0^c - \alpha \lambda_0^c (1 - v_0^c)] + \sum_{p=1}^{P} [R_p v_p - \beta \lambda_p (1 - v_p)] \quad (6)$$

where $\lambda_0^c$ and $\lambda_p$ are the occlusion penalties to be paid for neglecting the detector responses of the cell c and the parts p, respectively, and $\alpha$ and $\beta$ are the weights of the occlusion penalties.

Further, as mentioned above, to have visibility flags approximate situations where, in some embodiments, occlusions occur in a lower part of a detection window (e.g., a lower part of a pedestrian), the occlusion penalties can be based on a location of the root cell or a part of the detection window. For example, the occlusion penalty can be lower for root cells and parts located in a lower part of the detection window than root cells and parts located in a higher part of the detection window (See FIG. 3). This can be modeled with a sigmoid function as:

$$\lambda_0^c = \frac{1}{2}\left[\frac{1}{1 + e^{-\tau\left(h^c - \frac{h_0}{2}\right)}}\right] + \frac{1}{2}$$

where $h^c$ is the height of the cell c from the bottom of the detection window and $\tau$ controls the steepness. As discussed above, FIG. 3 illustrates an occlusion penalty scale 300 according to a sigmoid function. Additionally, the application of the occlusion penalties to the root layer 206 as shown in FIG. 3, illustrates that the occlusion penalties can be lower for root cells and parts located in a lower part of the detection window than root cells and parts located in a higher part of the detection window. In a further embodiment, the occlusion penalty is based on a location of the root cell and part with respect to an image of a pedestrian, wherein the input image includes the image of the pedestrian. More specifically, the occlusion penalty is lower when the root cell or part is located in a lower part of the pedestrian.

Since, in some embodiments, occlusions can happen in continuous parts of an object, at block 606, the method includes applying cell-to-cell consistency, and at block 608, the method includes applying part-to-cell consistency. In some embodiments, the visibility flag module 116 can determine and apply the cell-to-cell consistency and part-to-cell consistency. More specifically, determining visibility flags includes applying consistent visibility flags to adjacent root cell. Further, determining visibility flags includes applying consistent visibility flags to overlapping parts and root cells. Said differently, determining visibility flags for each root cell can be based on the cell level response score and a location of the root cell relative to adjacent root cells. Further, determining visibility flags for each part can be based on the part response score and a location of the part relative to overlapping cells.

As mentioned above, FIG. 2A illustrates cell-to-cell consistency and part-to-cell consistency. More specifically, in FIG. 2A, the root cells (e.g., root cell 208) are represented by the squares on the input image 202 in the root cell layer 206. The parts (e.g., part 212) in the parts layer 210 are drawn above the root cells. The lines between the root cells and the parts indicate cell-to-part consistency. Further, the dotted lines shown on the root cell layer 206 indicate cell-to-cell consistency. The expectation is that occlusions can happen on continuous parts of an object, which relate to adjacent root cells and parts that overlap the root cells.

To determine visibility maps with this configuration (i.e., cell-to-cell consistency and part-to-cell consistency), two terms are added to equation (6), specifically:

$$\widehat{v_0}, \{\widehat{v_p}\}_{p=1}^{P} = \arg\max_{v_0, \{v_p\}} \sum_{c=1}^{C} [R_0^c v_0^c - \alpha \lambda_0^c (1 - v_0^c)] + \quad (7)$$

$$\sum_{p=1}^{P} [R_p v_p - \beta \lambda_p (1 - v_p)] - \gamma \sum_{c_i \sim c_j} |v_0^{c_i} - v_0^{c_j}| - \gamma \sum_{c_i \approx p_j} |v_0^{c_i} - v_{p_j}|$$

where $c_i \sim c_j$ denotes that $c_i$ and $c_j$ are adjacent cells, $c_i \approx p_j$ denotes that the cell $c_i$ and the part $p_j$ overlaps, and $\gamma$ is a regularization pattern.

Referring again to FIG. 4, at block 412 the method includes determining a detection score (e.g., a new detection score considering the visibility flags and occlusion penalties) for the detection window based on the visibility flags and the occlusion penalties. Accordingly, equation (7) is an optimization problem that maximizes the detection score. To solve the maximization problem, in one embodiment Alternating Direction Method of Multipliers (ADMM) is used. In this embodiment, to apply ADMM, the integer constraints from equation (7) are removed.

To simplify the notation, let $q=[v_0^0 \ldots v_0^C v_1 \ldots v_p]^T$ be a column vector that groups the visibility flags together and $\omega=[(R_0^0+\alpha\lambda_0^0) \ldots (R_0^c+\alpha\lambda_0^c) (R_1+\beta\lambda_1) \ldots (R_p+\beta\lambda_p)]^T$ stacks the score and occlusion penalty for each cell and part. Here, both q and $\omega$ are C+P dimensional vectors. To convert the consistency terms in equation (7) into matrix forms, the differentiation matrices are constructed as D' and D" as:

$$D'_{c_i \sim c_j, k} = \begin{cases} +1 & \text{if } k = i \\ -1 & \text{if } k = j \\ 0 & \text{otherwise} \end{cases} \quad (8)$$

$$D''_{c_i \approx p_j, k} = \begin{cases} +1 & \text{if } k = i \\ -1 & \text{if } k = j \\ 0 & \text{otherwise} \end{cases}$$

which can be stacked as $D=[(D')D^T (D'')^T]^T$. In ADMM form, the problem in equation (7) can be written as:

$$\text{minimize } -\omega^T q + \lambda\|z_1\|_1 + J_{[0,1]}(z_2) \quad (9)$$
$$\text{subject to } Dq = z_1,$$
$$q = z_2,$$
$$q \in [0, 1]^{C+P},$$

where $\|\cdot\|_1$ is the $l_1$-norm, $J_{[0,1]}(\cdot)$ is the indicator function which maps the input value that is between 0 and 1 to 0 and any other value to $\infty$. Accordingly, the augmented Lagrangian function can be expressed as:

$$L(\omega, z_1, z_2, u_1, u_2) = \quad (10)$$

$$-\omega^T q + \lambda \|z_1\|_1 + J_{[0,1]}(z_2) + \frac{\rho_1}{2} \|Dq - z_1 + u_1\|_2^2 + \frac{\rho_2}{2} \|q - z_2 + u_2\|_2^2,$$

where $p_1 > 0$, $p_2 > 0$ are penalty parameters.

The ADMM algorithm can then be expressed as:

$$q^{k+1} := (\rho_1 D^T D + \rho_2 I)^{-1} (\omega + \rho_1 D^T(z_1^k - u_1^k) + \rho_2(z_2^k - u_2^k))$$

$$z_1^{k+1} := S_{\lambda/\rho_1}(Dq^{k+1} + u_1^k)$$

$$z_2^{k+1} := \Pi_{[0,1]}(q^{k+1} + u_2^k)$$

$$u_1^{k+1} := u_1^k + Dq^{k+1} - z_1^{k+1}$$

$$u_2^{k+1} := u_2^k + q^{k+1} - z_2^{k+1}, \quad (11)$$

$\Pi_{[0,1]}(\cdot)$ projects the input variable onto $[0,1]$ and $S_\kappa(\cdot)$ is the soft thresholding function defined as:

$$S_\kappa(a) = \begin{cases} a - \kappa, & a > \kappa \\ 0, & |a| \leq \kappa \\ a + \kappa, & a < -\kappa \end{cases} \quad (12)$$

To initialize q, the detector responses are thresholded as $[R_0^0 \ldots R_0^C R_1 \ldots R_p]^T$. When the minimization procedure converges, the elements of the final q estimate are projected onto $\{0,1\}$. In one embodiment, ADMM converged at most in 20 iterations. However, if ADMM does not converge by a predetermined iteration (e.g., 20), the q estimate of the last iteration can be used.

In one embodiment, the detection score excludes root cells and parts with a visibility flag of occluded. This is also shown by equation (7) above, as a visibility flag of occluded (i.e., equal to zero) will negate the response score of the root cell and/or part.

Referring again to FIG. 4, the method at block 414 includes generating an estimated visibility map for object detection based on the detection score. The estimated visibility map can include the response maps and visibility flags of the input image 202 shown in FIGS. 2B and 2C. The estimated visibility map can be transmitted to and used by vehicle systems 122 (e.g., ADAS) to analyze and detect partially occluded images (e.g., partially occluded pedestrians in a vehicle scene) and adjust vehicle systems accordingly.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for partially occluded object detection, comprising:
    obtaining a response map for a detection window of an input image, wherein the response map is based on a trained model and the response map includes a root layer and a parts layer;
    determining visibility flags for each root cell of the root layer and each part of the parts layer based on the response map, wherein the visibility flag is one of visible or occluded;
    determining an occlusion penalty for each root cell with a visibility flag of occluded and for each part with a visibility flag of occluded, wherein the occlusion penalty is based on a location of the root cell or the part with respect to the detection window;
    determining a detection score for the detection window based on the visibility flags and the occlusion penalties; and
    generating an estimated visibility map for object detection based on the detection score.

2. The computer-implemented method of claim 1, wherein the trained model is a deformable parts model.

3. The computer-implemented method of claim 1, wherein obtaining the response map comprises determining a cell level response score for each root cell and a parts response score for each part.

4. The computer-implemented method of claim 3, wherein determining visibility flags for each root cell is based on the cell level response score and a location of the root cell relative to adjacent root cells.

5. The computer-implemented method of claim 3, wherein determining visibility flags for each part is based on the parts response score and a location of the part relative to overlapping root cells.

6. The computer-implemented method of claim 1, wherein the occlusion penalty
    is lower for root cells and parts located in a lower part of the detection window than root cells and parts located in a higher part of the detection window.

7. The computer-implemented method of claim 1, wherein determining visibility flags comprises applying consistent visibility flags to adjacent root cells.

8. The computer-implemented method of claim 7, wherein determining visibility flags comprises applying consistent visibility flags to overlapping parts and root cells.

9. A system for partially occluded object detection, comprising:
    an image input device receives an input image;
    an object detector determines a response map for a detection window of the input image, wherein the object detector determines the response map based on a trained model and the response map includes a root layer and a parts layer;
    a processor operatively connected for computer communication to the image input device and the object detector;
    a visibility flag module of the processor determines visibility flags for each root cell of the root layer and each part of the parts layer based on the response map, wherein the visibility flag is one of visible or occluded, the visibility flag module of the processor determines an occlusion penalty for each root cell with a visibility flag of occluded and for each part with a visibility flag of occluded, wherein the occlusion penalty is based on a location of the root cell or the part with respect to the detection window; and the object detector determines a detection score for the detection window based on the visibility flags and the occlusion penalties and generates an estimated visibility map for object detection based on the detection score.

10. The system of claim 9, wherein the object detector determines the detection score for the detection window based on a cell level response score of each root cell in the root cell layer and a parts response score based on each part of the parts layer.

11. The system of claim 9, wherein the occlusion penalties are lower for root cells and parts in a lower part of the detection window.

12. The system of claim 9, wherein the visibility flag module of the processor compares a deformable parts model detection score to a predetermined threshold.

13. The system of claim 12, wherein the visibility flag module of the processor determines visibility flags for the detection window if the deformable parts model detection score meets the predetermined threshold.

14. A computer-implemented method for partially occluded object detection, comprising:
obtaining a response map for a detection window of an input image, wherein the response map is based on a trained model and the response map includes a root layer and a parts layer;
determining visibility flags for each root cell of the root layer and each part of the parts layer based on the response map, wherein the visibility flag is one of visible or occluded;
determining a detection score for the detection window based on the visibility flags, wherein the detection score excludes root cells and parts with a visibility flag of occluded; and
generating an estimated visibility map for object detection based the detection score.

15. The computer-implemented method of claim 14, wherein obtaining the response map comprises determining a cell level response score for each root cell and a parts response score for each part.

16. The computer-implemented method of claim 15, wherein determining visibility flags for each root cell is based on the cell level response score and a location of the root cell relative to adjacent root cells.

17. The computer-implemented method of claim 16, wherein determining visibility flags for each part is based on the part response score and a location of the part relative to overlapping root cells.

18. The computer-implemented method of claim 14, wherein determining a detection score comprises determining an occlusion penalty for root cells and parts with a visibility flag of occluded.

19. The computer-implemented method of claim 18, wherein the occlusion penalty is based on a location of the root cell and parts with respect to an image of a pedestrian, wherein the input image includes the image of the pedestrian.

20. The computer implemented method of claim 19, wherein the occlusion penalty is lower when the root cell or part is located in a lower part of the pedestrian.

* * * * *